(12) United States Patent
Krude et al.

(10) Patent No.: US 6,821,208 B2
(45) Date of Patent: Nov. 23, 2004

(54) WHEEL HUB UNIT

(75) Inventors: Werner Krude, Neunkirchen-Seelscheid (DE); Ludger Wenning, Neunkirchen (DE)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/397,159

(22) Filed: Mar. 26, 2003

(65) Prior Publication Data

US 2003/0202843 A1 Oct. 30, 2003

(30) Foreign Application Priority Data

Apr. 27, 2002 (DE) .......................... 102 19 018

(51) Int. Cl.⁷ ................. F16C 13/04; F16D 3/22; B60B 27/02
(52) U.S. Cl. .............. 464/178; 384/544; 384/589; 301/105.1
(58) Field of Search ................. 464/906, 178, 464/146, 145; 384/544, 539, 589; 301/126, 105.1; 403/DIG. 7, 315

(56) References Cited

U.S. PATENT DOCUMENTS

| | | |
|---|---|---|
| 4,881,842 A | 11/1989 | Farrell et al. |
| 5,536,098 A * | 7/1996 | Schwarzler ............. 403/259 |
| 6,135,571 A * | 10/2000 | Mizukoshi et al. ...... 301/105.1 |
| 6,488,589 B2 * | 12/2002 | Ouchi et al. ............... 464/178 |
| 6,497,515 B1 * | 12/2002 | Sahashi et al. ............ 384/544 |
| 6,524,012 B1 * | 2/2003 | Uchman ..................... 384/544 |

FOREIGN PATENT DOCUMENTS

| | | |
|---|---|---|
| DE | 31 26 192 A1 | 1/1983 |
| DE | 197 00 313 A1 | 7/1997 |
| DE | 198 82 672 T1 | 10/2000 |
| EP | 0 936 086 A2 | 8/1999 |

* cited by examiner

Primary Examiner—David Bagnell
Assistant Examiner—K. Thompson

(57) ABSTRACT

A wheel hub unit having a wheel hub (11), a wheel bearing (19) and an outer joint part (15) of a constant velocity universal joint which, at the hub end, includes a shaft journal (16) with shaft splines (17), which shaft journal (16) is inserted into a through-aperture (13) of the wheel hub, which through-aperture (13) is provided with internal splines (14), wherein an axial securing mechanism between the wheel hub (11) and the outer joint part (15) are formed by a securing ring (18) which comprises a rectangular cross-section and which engages corresponding rectangular circumferential grooves in the internal splines (14) and in the shaft splines (17) and is arranged near the end of the shaft journal, and wherein, at the shaft journal (16), near its base, there is provided a centering collar which, in a radially play-free way, engages the through-aperture (13) of the wheel hub (11).

13 Claims, 5 Drawing Sheets

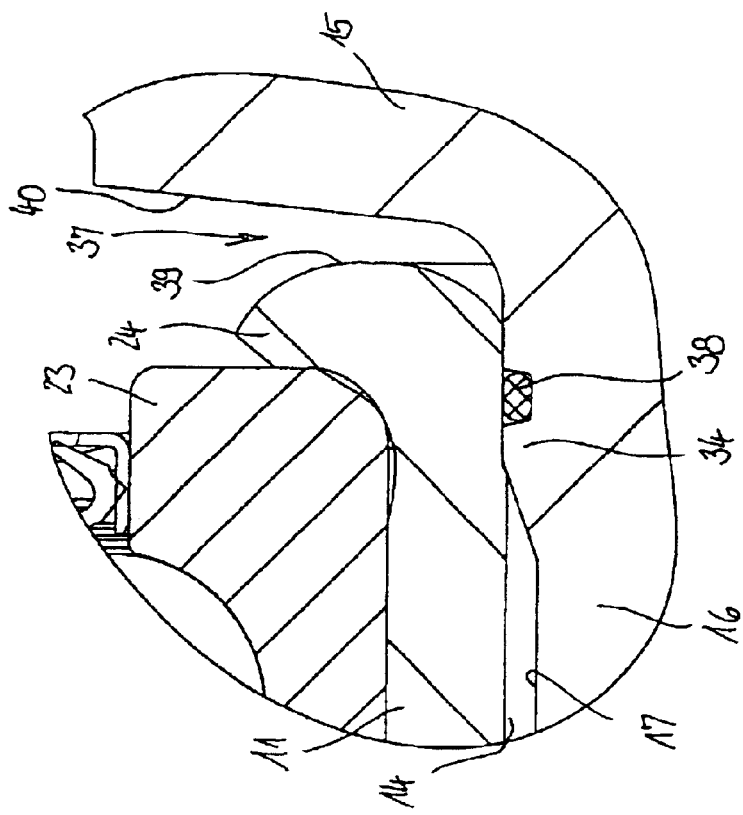
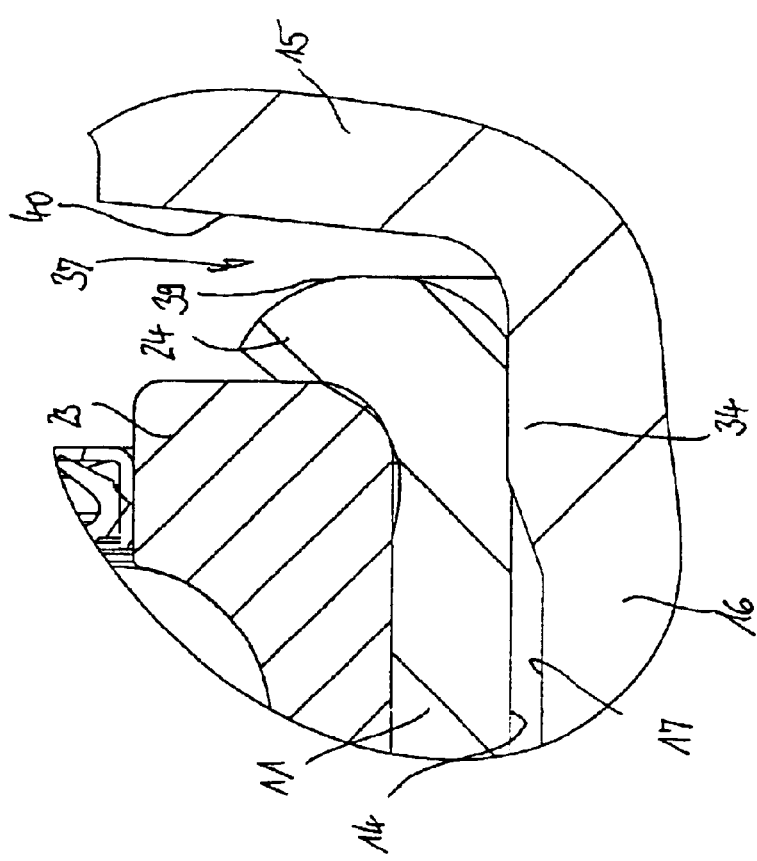

WHEEL HUB UNIT

TECHNICAL FIELD

The invention relates to a wheel hub unit having a wheel hub, a wheel bearing and an outer joint part of a constant velocity universal joint which, at the hub end, comprises a shaft journal with shaft splines. The shaft journal is inserted into a through-aperture of the wheel hub. The through-aperture is provided with internal splines.

BACKGROUND OF THE INVENTION

A wheel hub unit with the above-mentioned characteristics is known from EP 936 086 A2, for example, wherein the axial securing means between the wheel hub and outer joint part are provided in the form of a securing ring with a round cross-section. The securing ring is inserted into corresponding grooves in the internal splines, and in the shaft splines near the free end of the shaft journal at the outer joint part. In addition, there is provided a sealing ring which is slipped on to the shaft journal near the base of same and which sealingly engages a recess in the through-aperture of the wheel hub. For dismantling purposes, this type of axial securing means requires the outer joint part and, respectively, the journal to be pressed out of the wheel hub. In the course of this operation it is possible to damage the securing ring and also the grooves. Because the holding forces of such axial securing means are somewhat inadequate, axial security to prevent automatic axial unfastening of the connection in case of an axial impulse load no longer exists after re-assembly.

SUMMARY OF THE INVENTION

The present invention provides a wheel hub unit of the above-mentioned type with an improved axial securing mechanism. The axial securing mechanism is a securing ring which comprises a rectangular cross-section and which engages corresponding rectangular circumferential grooves at the shaft splines and in the internal splines. Also, at the shaft journal, near its base, there is provided a centering collar which, in a radially play-free way, engages the through-aperture of the wheel hub. The axial securing mechanism provides the necessary security against unintentional axial dismantling because neither the securing ring nor the grooves comprise radii or chamfers which allow automatic disconnection through axially pressing out of the outer joint part and journal. The axial securing mechanism allows the securing ring to be acted upon without causing damage in such a way that it can leave one of the grooves and enter the other groove completely, so that the parts, i.e. the hub and shaft journal, can be displaced relative to one another and assembled without being obstructed. As a result of the rectangular securing ring which engages rectangular circumferential grooves, axial displacements are avoided. This is assisted by the centering collar which is attached at a relatively great axial distance therefrom and which accommodates radial forces of bending moments (secondary moments) occurring under torque. The connection is also noise-free.

According to a further embodiment, at the shaft journal, close to its base, there is slipped on a sealing ring which is sealingly positioned between the through-aperture of the wheel hub and the shaft journal. In this way it is possible to avoid fretting corrosion in the inter-engaging toothings. In this context, it is proposed according to an advantageous embodiment, at its end face, the shaft journal comprises a countersunk region which extends axially from its free end and projects beyond the circumferential groove. The shaft journal also comprises a radial notch which extends axially from its free end as far as the circumferential groove and into the countersunk region. Inwardly bent free ends of the securing ring extend through the notch into the countersunk region. In this way, the securing ring can be radially pulled together from the outer end of the wheel hub in such a way that it is able to enter fully the deep circumferential groove on the shaft journal, so that it simultaneously leaves the inner groove in the wheel hub, thus permitting both parts to be displaced relative to one another for dismantling purposes.

The inventive axial securing mechanism allows a defined annular gap to be determined between the bearing and the outer joint part. In this way, it is possible to avoid the formation of noise. The annular gap should be axially wider than the entire axial play of the securing ring in its circumferential grooves.

According to a first advantageous design, the wheel bearing comprises a double-row rolling contact bearing which comprises an inner bearing race which is slipped on to the wheel hub from the joint end, and which is axially held on the wheel hub by a radially outwardly pointing wheel hub beading at the joint end. In this embodiment, the wheel hub carries an integrally formed-on wheel flange.

According to a further design, the wheel bearing comprises a double-row rolling contact bearing which comprises an inner bearing race which is slipped on to the wheel hub from the wheel end, and which is axially held on the wheel hub by a radially outwardly pointing wheel hub beading at the wheel end.

Wheel bearings of this type can be produced with a large number of balls/rollers and with a permanent bearing pretension. The bearings can be ball bearing or tapered roller bearings.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 6 shows the detail according to FIG. 5 in a modified form.

FIG. 7 shows the detail according to FIG. 6 in a modified form.

DETAILED DESCRIPTION OF THE INVENTION

Figure 1:
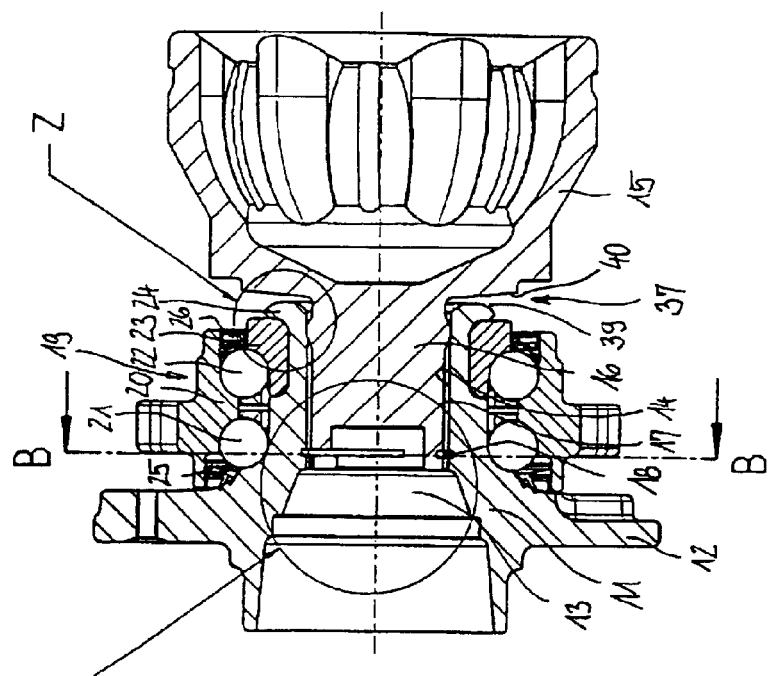
FIG. 1 is a longitudinal section through an inventive wheel hub unit in a first embodiment taken along line A—A of FIG. 2.
Figure 2:
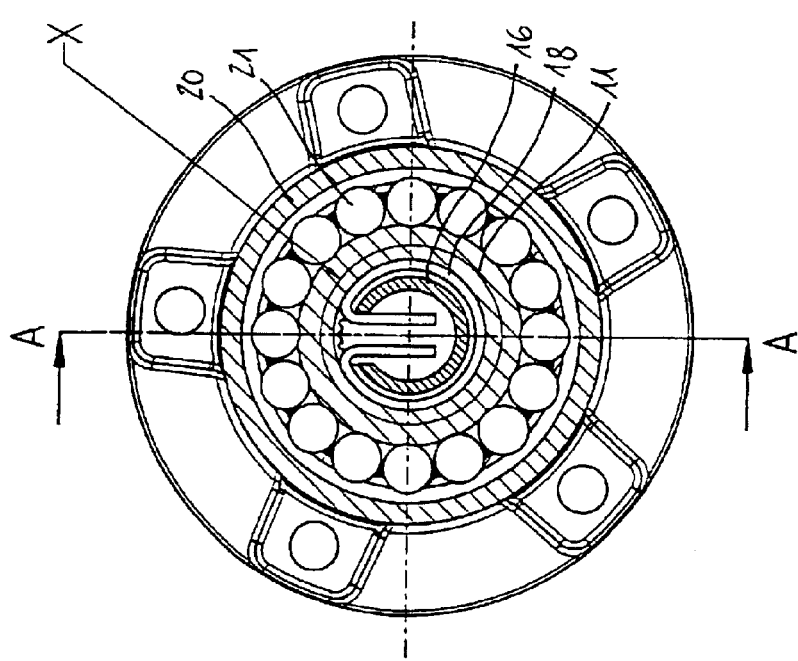
FIG. 2 is a cross-section of a detail according to FIG. 1 taken along line B—B of FIG. 1.

FIGS. 1 and 2 will be described jointly below. The inventive wheel hub unit comprises a wheel hub 11 with a formed-on wheel flange 12. Furthermore, it comprises an axial through-aperture 13 part of which is provided with internal splines 14. The wheel hub is connected to an outer joint part 15 of a constant velocity universal joint whose remaining parts are not illustrated. A shaft journal 16 provided with shaft splines 17 is formed on to the outer joint part 15. By means of its shaft splines 17, the shaft journal 16 is inserted into the part of the through-aperture 13 which is provided with the internal splines 14. The wheel hub 11 and the outer joint part 15 are axially secured relative to one another by means of a securing ring 18. The wheel hub 11, and thus also the outer joint part 15 connected thereto, are supported in a double-row wheel bearing 19 having an outer bearing race 20, two rows of balls 21, 22 and an inner bearing race 23 slid on to the wheel hub and associated the second row of balls 22. By means of a beading 24 of the wheel hub 11, the inner bearing race 23 is axially secured on the wheel hub 11. The wheel bearing 19 is sealed towards the outside by means of sealing rings 25, 26. Between the outer joint part 15 and the beading 24 there is formed an annular gap 37 in order to ensure a defined positive distance, and thus freedom of contact, between the beaded shoulder face 39 of the wheel hub 11 and the end face 40 of the outer joint part 15.

Figure 3:
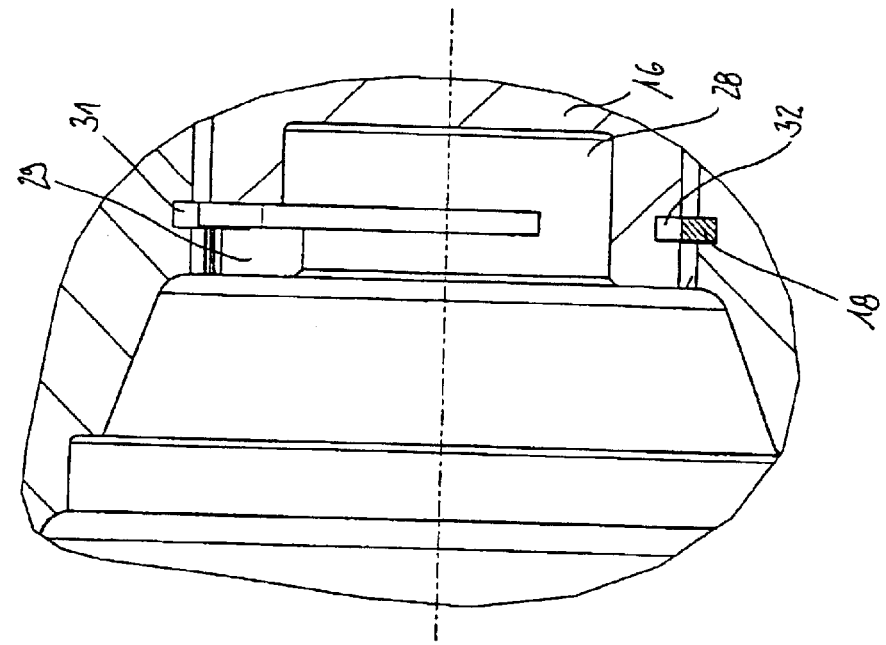
FIG. 3 shows the enlarged detail Y of FIG. 1.
Figure 4:
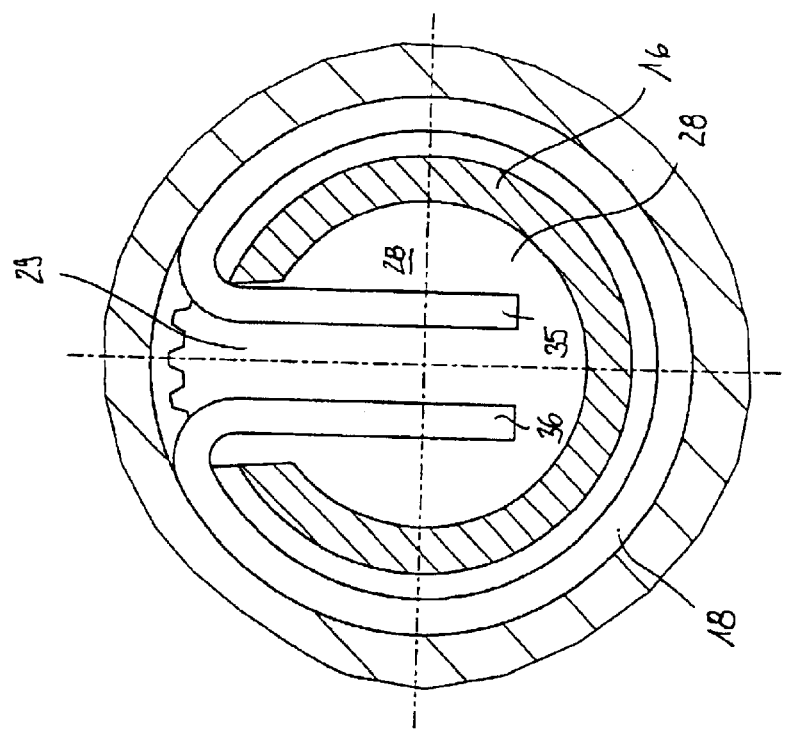
FIG. 4 shows the enlarged detail X of FIG. 2.

FIGS. 3 and 4 which show the axial securing mechanism of the wheel hub and the outer joint part, will be described jointly below. It can be seen that, at its free end, the shaft journal 16 comprises a countersunk region or recess 28 and that, starting from the recess 28, there is provided a radial notch 29 in the wheel hub 11. The notch 29 extends radially as far as the position of an inner groove 31 in the wheel hub 11 and an associated circumferential groove 32 on the shaft journal 16. The two grooves 31, 32 are engaged in an axially securing way by the securing ring 18 with its rectangular cross-section. The securing ring 18 is positioned with pretension in the inner groove 31 and comprises two inwardly bent free ends 35, 36 which, through the notch 29, extend inwardly into the recess 28. By pulling together the free ends, the entire securing ring 18 is simultaneously pulled together in such a way that it leaves the inner groove 31 in the wheel hub 11. At such time, the shaft journal 16, together with the securing ring 18 which had entered the circumferential groove 32, can be axially released from the wheel hub 11 in a non-destructive way.

The axial securing mechanism allows the width of the annular gap 37 between the shoulder face 39 and end face 40 to be optimally defined to reduce or eliminate any noise in the assembly. In this regard, the annular gap 37 should be axially wider than the total axial play of the securing ring 18 in the circumferential grooves 31, 32.

Figure 5:
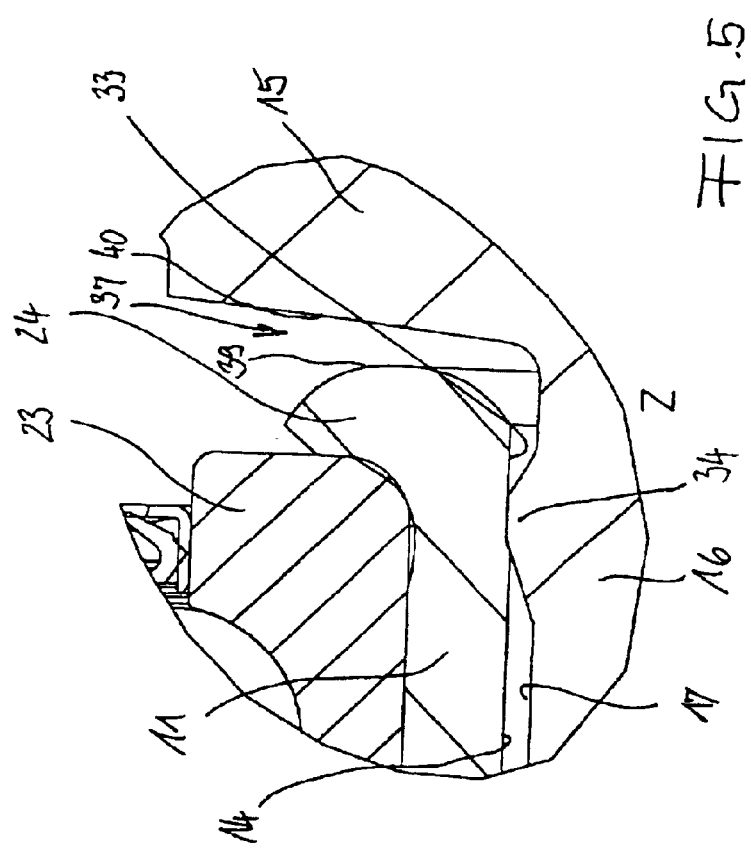
FIG. 5 shows the enlarged detail Z of FIG. 1.

FIG. 5, on the one hand, shows how the separate inner bearing race 23 of the wheel bearing is axially secured on the wheel hub 11 by means of the beading 24 at the wheel hub. The beading 24 was initially provided in the form of a cylindrical extension, allowing the inner bearing race 23 to be slipped with play on to the wheel hub 11. Subsequently, the beading 24 was formed on to point outwardly. Furthermore, it can be seen that at the end of the shaft splines 17, there is provided a collar 34 on the shaft journal 16, which collar 34 radially engages in a play-free way an inner recess 33 at the end of the internal splines 14. The inter-engaging toothings 14, 17 are sealed relative to one another by, for example, a paste and are thus largely protected against corrosion. The toothings 14, 17 are also radially supported in such a way that, if the inventive unit is subjected to bending loads, radial movements cannot occur, which means that no fretting corrosion can develop in the shaft splines. If a sealing paste is used, it also simplifies the operation of sliding the parts into one another during assembly.

FIG. 6, while otherwise showing the same parts and reference numbers as FIG. 5, shows that the collar 34, on one side, is continued in a thickened form as far as the transition into the end face 40 of the outer joint part 15.

FIG. 7, while otherwise showing the same parts and reference numbers as FIG. 6, shows a sealing ring 38 which is inserted into a groove in the collar 34, which sealing ring has a sealing effect relative to the wheel hub 11.

Figure 8:
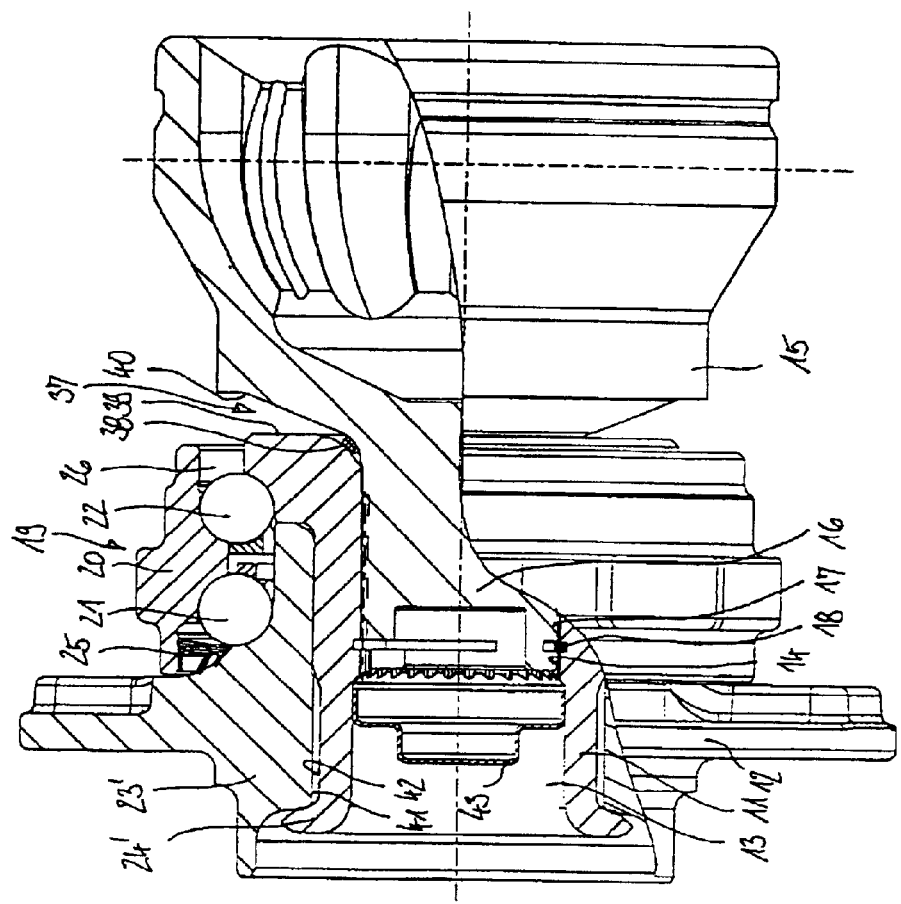
FIG. 8 is a longitudinal section through an inventive wheel hub unit in a second embodiment.

FIG. 8 illustrates a wheel hub 11 on to which there is slid an inner bearing race 23' of a wheel bearing 19 with an outer bearing race 20 and two rows of balls 21, 22, with a wheel flange 12 being formed on to the inner bearing race 23'. The inner bearing race 23' is axially secured in the wheel hub 11 by a beading 24' which is provided on the outside. The wheel bearing 19 is sealed towards the outside by sealing rings 25, 26. The wheel hub 11 forms an axial through-aperture 13 part of which is provided with internal splines 14. The wheel hub 11 and the inner bearing race 23' are connected to one another in a rotationally fast way by internal splines 41 and shaft splines 42 which engage one another. The wheel hub 11 is connected by internal splines 14 to an outer joint part 15 of a constant velocity universal joint whose remaining parts are not illustrated here. A shaft journal 16 provided with shaft splines 17 is formed on to the outer joint part 15. By means of its shaft splines 17, the shaft journal 16 is inserted into the part of the through-aperture 13 which is provided with the internal splines 14. The wheel hub 11 and the outer joint part 15 are axially secured relative to one another by a securing ring 18. Between the outer joint part 15 and the shoulder 39 of the wheel hub 11 there is formed an annular gap 37 which ensures a defined positive distance, and thus freedom of contact, between the shoulder 39 of the wheel hub 11 and the end face 40 of the outer joint part 15. A sealing ring 38 is inserted between the shoulder 39 and the end face 40. A removable cover 43 seals the open end of the wheel hub 11.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A wheel hub unit comprising:
   a wheel hub (11) with a through-aperture (13) having internal splines (14);
   a wheel bearing (19);
   an outer joint part (15) of a constant velocity universal joint which, at the hub end, comprises a shaft journal (16) with shaft splines (17), which shaft journal (16) is inserted into the through-aperture (13) of the wheel hub;
   an axial securing mechanism between the wheel hub (11) and the outer joint part (15) comprising a securing ring (18) having a rectangular cross-section and which engages corresponding rectangular circumferential grooves (31, 32) in the internal splines (14) and in the shaft splines (17), wherein the securing ring (18) is arranged near the end of the shaft journal, and
   wherein, the shaft journal (16), near its base, includes a centering collar (34) which, in a radially play-free way, engages the through-aperture (13) of the wheel hub (11) and wherein, at its end face, the shaft journal (16) comprises a central recess (28) which extends axially from the free end and project beyond the circumferential groove (32) in the internal splines (14), and a radial notch (29) which extends axially from the free end as far as the circumferential groove (32) in the internal splines (14) and into the central recess (28), and wherein inwardly bent free ends (35, 36) of the securing ring (18) extend through the notch (29) into the recess (28).

2. A wheel hub unit according to claim 1, wherein a shoulder face (39) of the wheel hub (11), at the joint end, and an end face (40) of the outer joint part (15), at the hub end, form an open annular gap (37).

3. A wheel hub unit according to claim 1 comprising a sealing ring (38) near the base of the shaft journal (16), and sealingly positioned between the through-aperture (13) of the wheel hub (11) and the shaft journal (16) of the outer joint part (15).

4. A wheel hub unit according to claim 2 comprising a sealing ring (38) near the base of the shaft journal (16), and sealingly positioned between the through-aperture (13) of the wheel hub (11) and the shaft journal (16) of the outer joint part (15).

5. A wheel hub unit according to claim 1, wherein the wheel bearing (19) comprises a double-row rolling contact bearing comprising an inner bearing race (23) which is slid from the joint end on to the wheel hub (11) and which is axially held on the wheel hub by an outwardly directed beading (24) of the wheel hub (11), at the joint end.

6. A wheel hub unit according to claim 2, wherein the wheel bearing (19) comprises a double-row rolling contact bearing comprising an inner bearing race (23) which is slid from the joint end on to the wheel hub (11) and which is axially held on the wheel hub by an outwardly directed beading (24) of the wheel hub (11), at the joint end.

7. A wheel hub unit according to claim 3, wherein the wheel bearing (19) comprises a double-row rolling contact bearing comprising an inner bearing race (23) which is slid from the joint end on to the wheel hub (11) and which is axially held on the wheel hub by an outwardly directed beading (24) of the wheel hub (11), at the joint end.

8. A wheel hub unit according to claim 4, wherein the wheel bearing (19) comprises a double-row rolling contact bearing comprising an inner bearing race (23) which is slid from the joint end on to the wheel hub (11) and which is axially held on the wheel hub by an outwardly directed beading (24) of the wheel hub (11), at the joint end.

9. A wheel hub unit according to claim 5, wherein the wheel hub (11) includes an integral wheel flange (12).

10. A wheel hub unit according to claim 1, wherein the wheel bearing (19) comprises a double-row rolling contact bearing comprising an inner bearing race (23') which is slid from the wheel end on to the wheel hub (11) and which is axially held on the wheel hub (11) by an outwardly directed beading (24') of the wheel hub, at the wheel end.

11. A wheel hub unit according to claim 10, wherein the inner bearing race (23') includes an integral wheel flange (12).

12. A wheel hub unit according to claim 2, wherein the annular gap (37) is axially wider than a sum of the axial play between the securing ring (18) and the circumferential grooves (31, 32).

13. A wheel hub unit according to claim 6, wherein the annular gap (37) is axially wider than a sum of the axial play between the securing ring (18) and the circumferential grooves (31, 32).

* * * * *